(12) United States Patent
Park et al.

(10) Patent No.: US 7,836,361 B2
(45) Date of Patent: Nov. 16, 2010

(54) APPARATUS AND METHOD FOR DECIDING ADAPTIVE TARGET PACKET ERROR RATE IN WIRELESS COMMUNICATION SYSTEM

(75) Inventors: Si-Hyun Park, Hwaseong-si (KR); June Moon, Seoul (KR); Yong-Seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 12/069,675

(22) Filed: Feb. 12, 2008

(65) Prior Publication Data

US 2008/0195899 A1 Aug. 14, 2008

(30) Foreign Application Priority Data

Feb. 12, 2007 (KR) ...................... 10-2007-0014249

(51) Int. Cl.
*G06F 11/00* (2006.01)
(52) U.S. Cl. ..................................... 714/708
(58) Field of Classification Search ................. 714/704, 714/708
See application file for complete search history.

(56) References Cited

U.S. PATENT DOCUMENTS

| | | | |
|---|---|---|---|
| 6,490,461 B1 * | 12/2002 | Muller | 455/522 |
| 6,772,388 B2 * | 8/2004 | Cooper et al. | 714/774 |
| 6,965,780 B1 * | 11/2005 | Monogioudis et al. | 455/522 |
| 7,133,353 B2 * | 11/2006 | Sourour et al. | 370/208 |
| 7,321,614 B2 * | 1/2008 | Jacobsen et al. | 375/221 |
| 7,460,879 B2 * | 12/2008 | Furuya | 455/522 |
| 7,480,226 B2 * | 1/2009 | Kim et al. | 369/100 |
| 7,489,941 B2 * | 2/2009 | Nemethova et al. | 455/522 |
| 2004/0137860 A1 * | 7/2004 | Oh et al. | 455/127.1 |
| 2005/0097409 A1 * | 5/2005 | Shin et al. | 714/704 |
| 2006/0262840 A1 * | 11/2006 | Wang et al. | 375/221 |
| 2006/0293075 A1 * | 12/2006 | Kansakoski et al. | 455/522 |
| 2009/0073927 A1 * | 3/2009 | Ishii et al. | 370/329 |

FOREIGN PATENT DOCUMENTS

| | | |
|---|---|---|
| KR | 1020030035969 A | 5/2003 |
| KR | 1020050031550 A | 4/2005 |
| KR | 1020050100190 A | 10/2005 |

* cited by examiner

Primary Examiner—James C Kerveros

(57) ABSTRACT

An apparatus and method for deciding a target Packet Error Rate (PER) in a wireless communication system are provided. The method includes setting a target PER, comparing a variance of the target PER ($\Delta p(k)$) with a previous target PER variance ($\Delta p(k-1)$), and updating a next target PER variance ($\Delta p(k+1)$) using an average capacity and a previous average capacity in accordance with the comparison result between the target PER variance ($\Delta p(k)$) and the previous target PER variance ($\Delta p(k-1)$).

21 Claims, 3 Drawing Sheets

APPARATUS AND METHOD FOR DECIDING ADAPTIVE TARGET PACKET ERROR RATE IN WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Feb. 12, 2007 and assigned Serial No. 2007-14249, the contents of which are herein incorporated by reference.

TECHNICAL FIELD OF THE INVENTION

The present invention relates generally to deciding a target Packet Error Rate (PER) in a wireless communication system, and in particular, to an apparatus and method for deciding an adaptive target PER according to a variation of a radio channel in a wireless communication system.

BACKGROUND OF THE INVENTION

Base stations and mobile stations perform reverse power control to keep radio link performance stable while minimizing the influence of interference in a wireless communication system. The reverse power control is to control a reverse Carrier-to-Interference and Noise Ratio (CINR) required, keeping a target PER constant. Here, if the reverse target PER is set to a low value, a reliability of a radio link increases, while the reverse CINR required to keep the low target PER increases. Inversely, if the reverse target PER is set to a high value, the reliability of the radio link decreases, while the reverse CINR required decreases due to the high target PER. A variation of the required reverse CINR leads to a variation of an output of a mobile station (MS), causing a variation of reverse interference amount, capacity, and coverage of a base station (BS). That is, if the reverse CINR required is large, the mobile station output increases and the base station reverse interference amount increases and consequently, the base station reverse coverage and capacity decrease. Inversely, if the reverse CINR is small, the mobile station output decreases and thus, the base station reverse interference amount decreases and its reverse coverage and capacity increase; however, the capacity increases to some degree but decreases at any more degree. Accordingly, it can be said that there is a trade-off relationship between the reliability of the radio link guaranteed by the power control and the reverse capacity and coverage.

FIG. 1 is a flow diagram illustrating operation of a base station (BS) for increasing average capacity at a fixed target PER according to the conventional art.

Referring to FIG. 1, in step 100, the BS sets a specific channel and sets a target PER ($P_{target}$) maximizing system capacity among several target PERs. After that, the BS performs outer loop power control with reference to the set target PER ($P_{target}$) in step 102 and performs inner loop/closed loop power control in step 104 and load control in step 106. That is, the BS maintains the target PER ($P_{target}$) through the outer loop power control, then controls an output of a mobile station (MS) through the inner loop power control on the basis of the target PER, and then performs the load control considering interference.

However, if a fixed target PER is used in a wireless communication system like the conventional art, a BS cannot properly reflect a varying channel state because a channel varies according to time. For example, if a target PER is excessively high compared to an instantaneous channel, a CINR required decreases, an MS's output decreases, and an Interference-to-Noise Ratio (INR) decreases compared to a target INR, but a reliability of a radio link decreases, a PER increases, and system capacity decreases. Inversely, if the target PER is excessively low compared to the instantaneous channel, the CINR required increases and thus, the MS's output increases and the INR is higher than the target INR. As a result, a Modulation and Coding Scheme (MCS) level and an allocated resource decrease through load control, thereby causing a loss of system capacity.

Further, when Hybrid Automatic Repeat reQuest (HARQ) is used, an error can be restored through retransmission though a PER is generated. Thus, a system can operate power control at a higher target PER compared to when HARQ is not used. If power control is operated at a higher target PER, a reverse CINR required can decrease, MS's transmission power can decrease, and BS's coverage and capacity can increase. Also, if using the same transmission power, an MS can operate power control at a higher Modulation Product coding Rate (MPR), thus increasing a reverse throughput. But, if a target PER is fixed, a loss of HARQ gain is brought about because the target PER cannot increase despite its possible increase.

Thus, there is needed an apparatus and method for deciding an adaptive target PER maximizing system capacity in consideration of channel variation and HARQ.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for deciding a target PER in a wireless communication system.

Another aspect of the present invention is to provide an apparatus and method for deciding an adaptive target PER maximizing system capacity in consideration of channel variation and HARQ in a wireless communication system.

The above aspects are achieved by providing an apparatus and method for deciding an adaptive target PER in a wireless communication system.

According to one aspect of the present invention, there is provided a method for deciding a target Packet Error Rate (PER) in a wireless communication system. The method includes setting a target PER, comparing a variance of the target PER ($\Delta p(k)$) with a previous target PER variance ($\Delta p(k-1)$), and updating a next target PER variance ($\Delta p(k+1)$) using average capacity and previous average capacity in accordance with the comparison result between the target PER variance ($\Delta p(k)$) and the previous target PER variance ($\Delta p(k-1)$).

According to another aspect of the present invention, there is provided an apparatus for deciding a target PER in a wireless communication system. The apparatus includes a target PER setter, a target PER comparator, and a target PER updater. The target PER setter sets a target PER. The target PER comparator compares a variance of the target PER ($\Delta p(k)$) with a previous target PER variance ($\Delta p(k-1)$). The target PER updater updates a next target PER variance ($\Delta p(k+1)$) using average capacity and previous average capacity in accordance with the comparison result between the target PER variance ($\Delta p(k)$) and the previous target PER variance ($\Delta p(k-1)$).

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
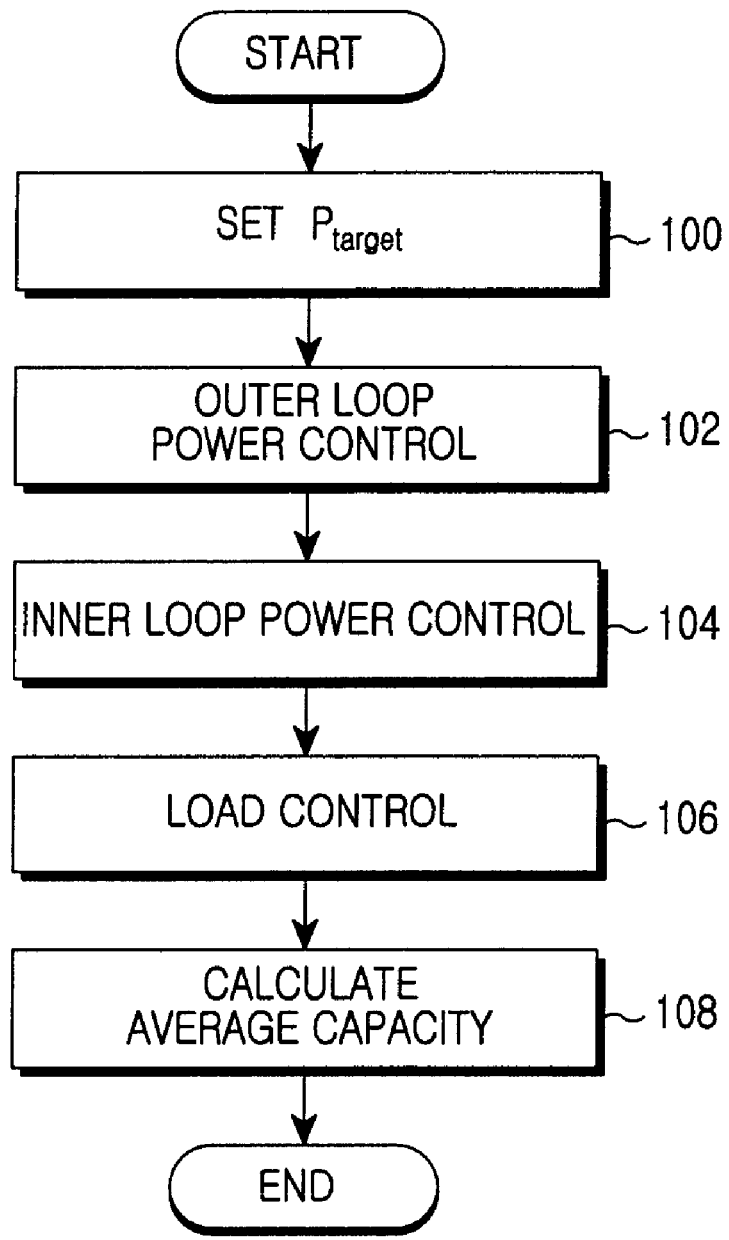
FIG. 1 is a flow diagram illustrating operation of a BS for maximizing average capacity in a wireless communication system according to the conventional art.
Figure 2:
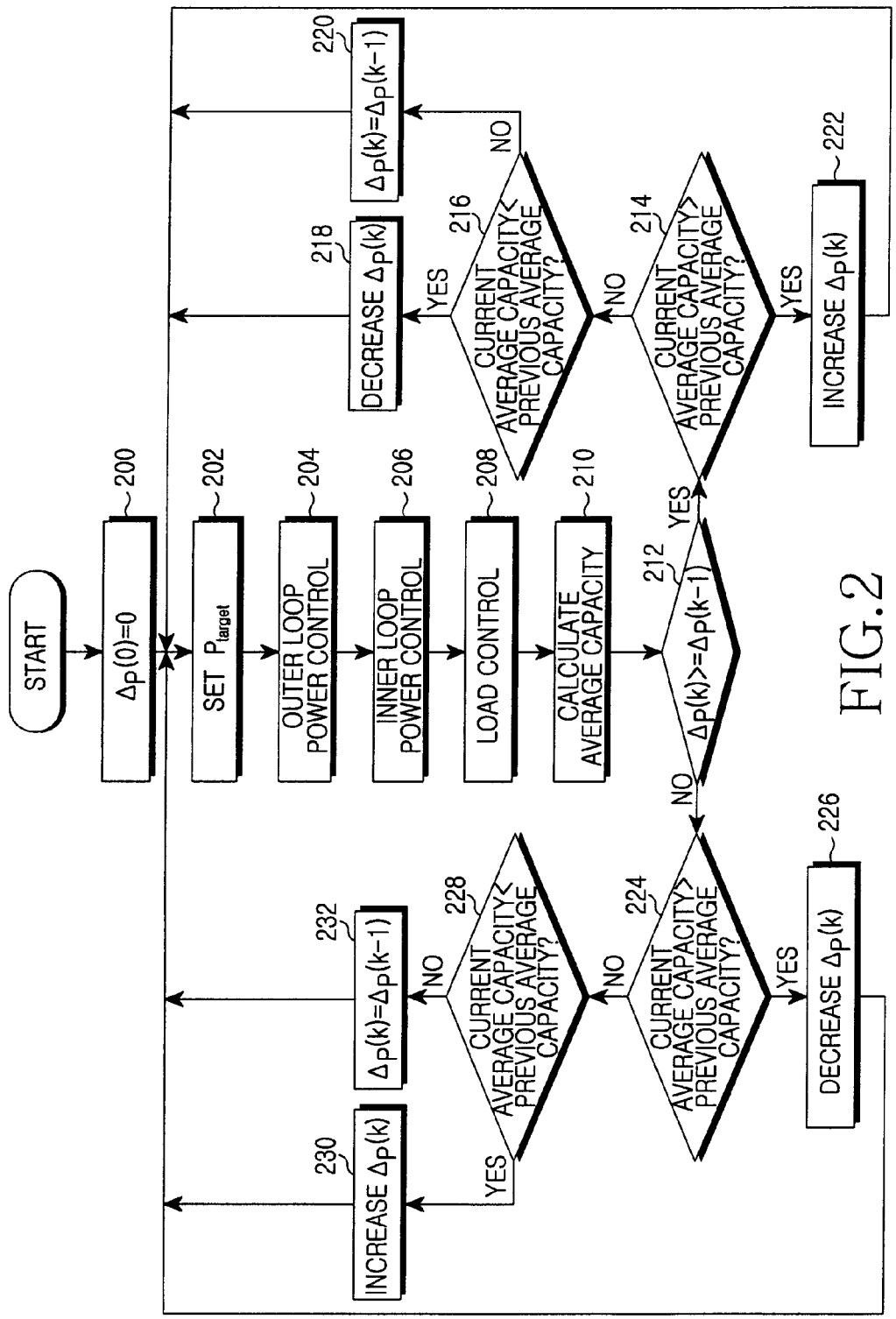
FIG. 2 is a flow diagram illustrating operation of a BS for maximizing average capacity in a wireless communication system according to an exemplary embodiment of the present invention.
Figure 3:
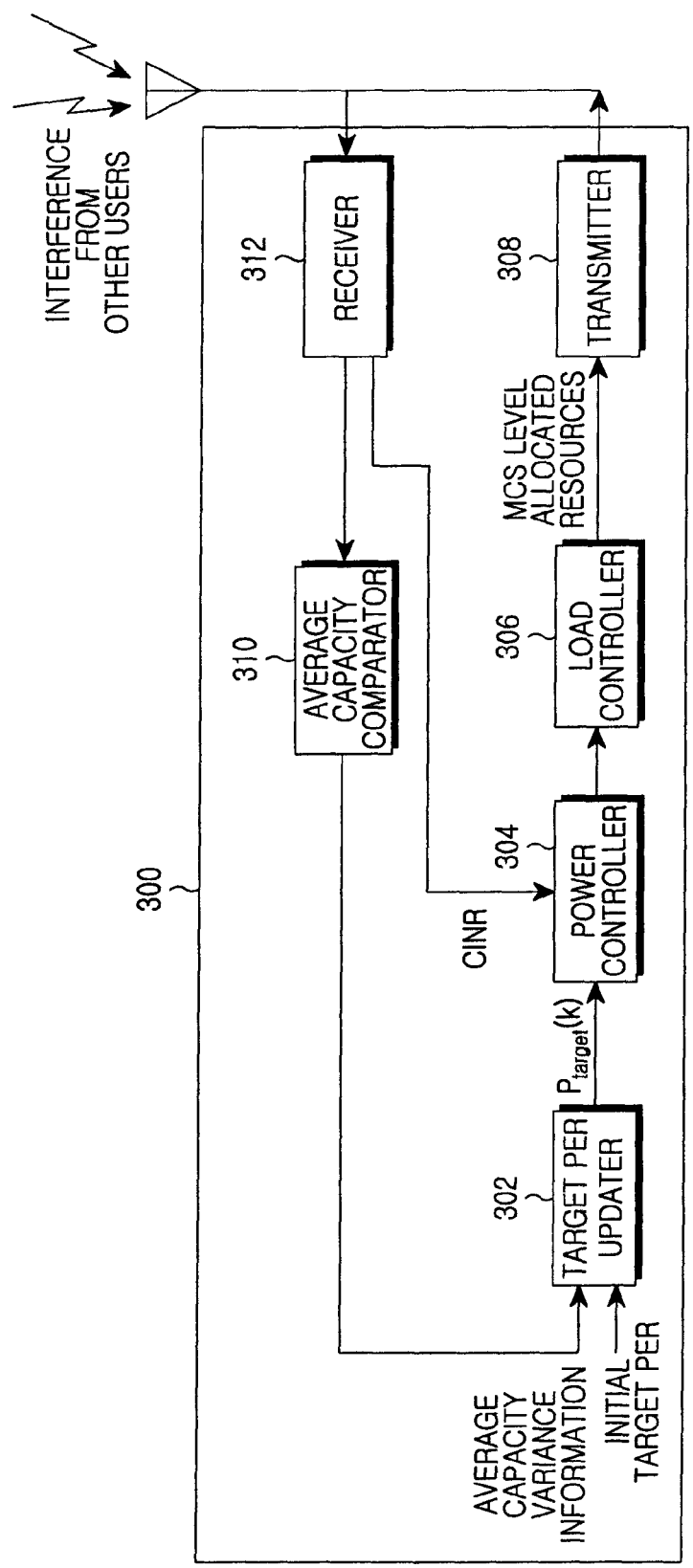
FIG. 3 is a block diagram illustrating a construction of a BS for maximizing average capacity in a wireless communication system according to an exemplary embodiment of the present invention.

FIGS. 2 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

An apparatus and method for deciding a target PER in accordance with channel variation and HARQ in a wireless communication system according to the present invention are described below.

FIG. 2 is a flow diagram illustrating operation of a BS for maximizing average capacity in a wireless communication system according to an exemplary embodiment of the present invention.

Referring to FIG. 2, the BS initializes a target PER variance parameter $\Delta p(0)$ in step 200. Here, the initial $\Delta p(0)$ is set to zero.

In step 202, the BS calculates a target PER value by Equation 1 below using the target PER variance parameter $\Delta p(0)$.

The target PER variance parameter is updated at each frame, varying an existing target PER according to channel variation:

$$P_{target}(k) = P_{target} + \Delta p(k), \quad [\text{Eqn. 1}]$$

where, $P_{target}(k)$ is the target PER value of k-th frame, $\Delta p(k)$ is the target PER variance parameter value of k-th frame, and $P_{target}$ is the target PER value initially set.

The BS performs outer loop power control, keeping the calculated PER value not too higher or lower than the target PER value in step 204.

After that, the BS performs inner loop power control, controlling an output of an MS in step 206. For example, the BS sends a notification of whether an uplink's reception strength is high or low to the MS, whereby the MS provides an output to keep a received signal strength of the BS constant.

In step 208, the BS then performs load control considering interference by MSs' outputs through the inner loop power control.

Next, the BS calculates average capacity (bit/second: bps) (($\Gamma_{avg}(k)$)) with reference to a successfully received bit number and a frame number in step 210. The average capacity (($\Gamma_{avg}(k)$)) is expressed in Equation 2 below:

$$\Gamma_{target}(k) = \frac{s}{k \times t} [bps], \quad [\text{Eqn. 2}]$$

where, $\Gamma_{target}(k)$ is the average capacity up to k-th frame, s is the successfully received bit number up to k-th frame, k is the frame number, and t is the frame length.

After that, the BS identifies a radio channel state in step 212. If the radio channel state is equal to $\Delta p(k)-\Delta p(k-1) \geqq 0$, that is, if a target PER variance parameter for a k-th frame ($\Delta p(k)$) is larger than or equal to a target PER variance parameter for a (k−1)-th frame ($\Delta p(k-1)$), the BS compares current average capacity ($\Gamma_{avg}(k)$) with previous average capacity ($\Gamma_{avg}(k-1)$) and identifies whether the comparison result is larger than a reference value in step 214. According to embodiment, $\Delta p(k) \geqq 0$ (that is, a state that the target PER variance parameter for the k-th frame ($\Delta p(k)$) is larger than or equal to 0) can replace the $\Delta p(k)-\Delta p(k-1) \geqq 0$ as a criterion to identify the radio channel state.

If a difference between the current average capacity ($\Gamma_{avg}(k)$) and the previous average capacity ($\Gamma_{avg}(k-1)$) is larger than the reference value in the step 214 ($\Gamma_{avg}(k) > \Gamma_{avg}(k-1) + \alpha$), the BS increases the target PER variance parameter ($\Delta p(k)$) by a preset Step in step 222 ($\Delta p(k) = \Delta p(k-1) + \text{Step}$). Inversely, if the difference is not larger than the reference value in the step 214 ($\Gamma_{avg}(k) < \Gamma_{avg}(k-1) - \alpha$), the BS identifies whether the difference is smaller than the reference value in step 216. If the difference is smaller than the reference value in the step 216, the BS decreases the target PER variance parameter ($\Delta p(k)$) by the preset Step in step 218 ($\Delta p(k) = \Delta p(k-1) - \text{Step}$).

If the difference is equal to the reference value in the step 216, the BS uses a previous target PER variance parameter in step 220 ($\Delta p(k) = \Delta p(k-1)$).

In other words, the BS increases the target PER variance parameter ($\Delta p(k)$) by the preset Step and identifies whether capacity can more increase if the difference is equal to or larger than the reference value in the radio channel state that is $\Delta p(k)-\Delta p(k-1) \geqq 0$ or $\Delta p(k) \geqq 0$. The BS decreases the target PER variance parameter ($\Delta p(k)$) by the preset Step and identifies whether capacity decreases if the difference decreases less than the reference value.

Meantime, if the radio channel state is equal to Δp(k)−Δp(k−1)<0, that is, if the target PER variance parameter for the k-th frame (Δp(k)) is smaller than the target PER variance parameter for the (k−1)-th frame (Δp(k−1)) in the step 212, the BS compares the current average capacity ($\Gamma_{avg}$(k)) with the previous average capacity ($\Gamma_{avg}$(k−1)) and identifies whether the comparison result is larger than a reference value in step 224. If a difference between the current average capacity and the previous average capacity is larger than the reference value in the step 224 ($\Gamma_{avg}$(k)>$\Gamma_{avg}$(k−1)+α), the BS decreases the target PER variance parameter (Δp(k)) by a preset Step in step 226 (Δp(k)=Δp(k−1)−Step).

Inversely, if the difference is not larger than the reference value in the step 224 ($\Gamma_{avg}$(k)<$\Gamma_{avg}$(k−1)−α), the BS identifies whether the difference is smaller than the reference value in step 228. If the difference is smaller than the reference value in the step 228, the BS increases the target PER variance parameter (Δp(k)) by the preset Step in step 230 (Δp(k)=Δp(k−1)+Step). If the difference is equal to the reference value in the step 228, the BS uses a previous target PER variance parameter in step 232 (Δp(k)=Δp(k−1)). Here, a margin value (α) can be used in the comparison between the current average capacity and the previous average capacity to avoid too sensitive reaction of the target PER.

In other words, the BS increases the target PER variance parameter (Δp(k)) by the preset Step if the difference is larger than the reference value in the radio channel state, Δp(k)−Δp(k−1)<0 or Δp(k)<0. The BS increases the target PER variance parameter (Δp(k)) by the preset Step if the difference decreases less than the reference value.

After that, the BS repeatedly obtains a target PER variance parameter on a per-frame basis until a system is terminated, calculating an adaptive target PER value.

FIG. 3 is a block diagram illustrating a construction of a BS for maximizing average capacity in a wireless communication system according to an exemplary embodiment of the present invention.

The BS 300 includes a receiver 312, an average capacity comparator 310, a target PER updater 302, a power controller 304, a load controller 306, and a transmitter 308.

The receiver 312 receives Radio Frequency (RF) signals from mobile stations, demodulates/decodes the RF signals, and outputs the demodulated/decoded signals to the average capacity comparator 310 and the power controller 304. The power controller 304 decides MS's power on the basis of $P_{target}$(k), which is a target PER of a k-th frame updated by the target PER updater 302, and a CINR received from the MS by the receiver 312. The load controller 306 controls interference by mobile station outputs decided by the power controller 304. The transmitter 308 codes/modulates data using a decided reverse MCS level and an allocated radio resource and outputs the coded/modulated data to the MS.

The average capacity comparator 310 compares reverse average capacity till current transmission with average capacity till previous transmission and outputs average capacity variance information to the target PER updater 302.

The target PER updater 302 decides a target PER of a next frame on the basis of the average capacity variance information and variance information on a target PER of a current frame. Detailed operation of the target PER updater 302 is as follows. If a target PER of a current frame is equal to or larger than a target PER of a previous frame and average capacity up to the current frame is larger than average capacity up to previous frame by a predetermined level or more, the target PER updater 302 increases the target PER by a preset step size repeatedly until capacity decreases. If the capacity decreases by a predetermined level or more, from then, the target PER updater 302 consecutively decreases the target PER by a preset step size until a time point the capacity decreases is discovered. The margin value (α) is putted to avoid excessively sensitive reaction of a target PER. Equation 3 below is an expression of operation of the target PER updater 302.

$$\Delta p(k)-\Delta p(k-1) \geq 0, \Gamma_{avg}(k) > \Gamma_{avg}(k-1)+\alpha : \Delta p(k+1) = \Delta p(k)+\text{step} \quad (3\text{-}1)$$

$$\Delta p(k)-\Delta p(k-1) \geq 0, \Gamma_{avg}(k) < \Gamma_{avg}(k-1)-\alpha : \Delta p(k+1) = \Delta p(k)-\text{step} \quad (3\text{-}2)$$

$$\Delta p(k)-\Delta p(k-1) \geq 0, |\Gamma_{avg}(k)-\Gamma_{avg}(k-1)| \leq \alpha : \Delta p(k+1) = \Delta p(k) \quad (3\text{-}3)$$

$$\Delta p(k)-\Delta p(k-1) < 0, \Gamma_{avg}(k) > \Gamma_{avg}(k-1)+\alpha : \Delta p(k+1) = \Delta p(k)-\text{step} \quad (3\text{-}4)$$

$$\Delta p(k)-\Delta p(k-1) < 0, \Gamma_{avg}(k) < \Gamma_{avg}(k-1)-\alpha : \Delta p(k+1) = \Delta p(k)+\text{step} \quad (3\text{-}5)$$

$$\Delta p(k)-\Delta p(k-1) < 0, |\Gamma_{avg}(k)-\Gamma_{avg}(k-1)| \leq \alpha : \Delta p(k+1) = \Delta p(k) \quad (3\text{-}6)$$

where, Δp(k)−Δp(k−1) is the parameter representing target PER variance compared to previous frame, $\Gamma_{avg}$(k) is the current target PER, $\Gamma_{avg}$(k−1) is the previous target PER, and α is the margin value for avoiding excessively sensitive reaction of target PER.

In other words, Equation 3-1 represents a case where a target PER increases when current average capacity is larger than previous average capacity by a predetermined level in a radio channel state, Δp(k)−Δp(k−1)≧0 or Δp(k)≧0. Equation 3-2 represents a case where a target PER decreases when current average capacity is smaller than previous average capacity by a predetermined level in a radio channel state, Δp(k)−Δp(k−1)≧0 or Δp(k)≧0. Equation 3-3 represents a case where there is not a target PER variance when current average capacity and previous average capacity are kept at a predetermined level in a radio channel state, Δp(k)−Δp(k−1)≧0 or Δp(k)≧0. Equation 3-4 represents a case where a target PER decreases when current average capacity is larger than previous average capacity by a predetermined level in conditions where a PER is set low because a channel state is worse compared to a previous frame in a radio channel state, Δp(k)−Δp(k−1)<0 or Δp(k)<0. Equation 3-5 represents a case where a target PER increases when current average capacity is smaller than previous average capacity by a predetermined level in a radio channel state, Δp(k)−Δp(k−1)<0 or Δp(k)<0. Equation 3-6 represents a case where there is not a target PER variance when current average capacity and previous average capacity are kept at a predetermined level in a radio channel state, Δp(k)−Δp(k−1)<0 or Δp(k)<0.

As described above, the present invention can advantageously maximize average capacity and improve system performance by deciding an adaptive target PER in consideration of radio channel variation and HARQ.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for deciding a target packet error rate (PER) in a wireless communication system, the method comprising:

setting a target packet error rate;

comparing a variance of the target packet error rate (Δp(k)) with a previous target PER variance (Δp(k−1)); and updating a next target PER variance (Δp(k+1)) using an average capacity and a previous average capacity in accordance with the comparison result between the target PER variance (Δp(k)) and the previous target PER variance (Δp(k−1)).

2. The method of claim 1, further comprising: calculating the average capacity.

3. The method of claim 1, wherein updating the next target PER variance (Δp(k+1)) comprises increasing the next target PER variance (Δp(k+1)) by a preset step size if the target PER variance (Δp(k)) is larger than or equal to the previous target PER variance (Δp(k−1)) and the average capacity is larger than the previous average capacity by a reference value or more.

4. The method of claim 1, wherein updating the next target PER variance (Δp(k+1)) comprises increasing the next target PER variance (Δp(k+1)) by a preset step size if the target PER variance (Δp(k)) is larger than or equal to the previous target PER variance (Δp(k−1)) and the average capacity is smaller than previous average capacity by a reference value or more.

5. The method of claim 1, wherein updating the next target PER variance (Δp(k+1)) comprises not varying the next target PER variance (Δp(k+1)) if the target PER variance (Δp(k)) is larger than or equal to the previous target PER variance (Δp(k−1)) and a difference between the average capacity and the previous average capacity is smaller than or equal to a reference value.

6. The method of claim 1, wherein updating the next target PER variance (Δp(k+1)) comprises decreasing the next target PER variance (Δp(k+1)) by a preset step size if the target PER variance (Δp(k)) is smaller than the previous target PER variance (Δp(k−1)) and the average capacity is larger than previous average capacity by a reference value or more.

7. The method of claim 1, wherein updating the next target PER variance (Δp(k+1)) comprises increasing the next target PER variance (Δp(k+1)) by a preset step size if the target PER variance (Δp(k)) is smaller than the previous target PER variance (Δp(k−1)) and the average capacity is smaller than the previous average capacity by a reference value or more.

8. The method of claim 1, wherein updating the next target PER variance (Δp(k+1)) comprises not varying the next target PER variance (Δp(k+1)) if the target PER variance (Δp(k)) is smaller than the previous target PER variance (Δp(k−1)) and a difference between the average capacity and the previous average capacity is smaller than or equal to a reference value.

9. The method of claim 1, further comprising: performing outer loop power control to keep the target PER constant.

10. The method of claim 9, further comprising: after the outer loop power control, performing inner loop and closed loop power control deciding outputs of mobile stations.

11. The method of claim 10, further comprising: performing load control in consideration of the outputs of the mobile stations by the inner loop power control.

12. An apparatus for deciding a target packet error rate (PER) in a wireless communication system, the apparatus comprising:

a target PER setter for setting a target packet error rate;

a target PER comparator for comparing a variance of the target PER (Δp(k)) with a previous target PER variance (Δp(k−1)); and a target PER updater for updating a next target PER variance (Δp(k+1)) using an average capacity and a previous average capacity in accordance with the comparison result between the target PER variance (Δp(k)) and the previous target PER variance (Δp(k−1))

13. The apparatus of claim 12, further comprising: an average capacity comparator for calculating the average capacity.

14. The apparatus of claim 12, wherein the target PER updater increases the next target PER variance (Δp(k+1)) by a preset step size if the target PER variance (Δp(k)) is larger than or equal to the previous target PER variance (Δp(k−1)) and the average capacity is larger than the previous average capacity by a reference value or more.

15. The apparatus of claim 12, wherein the target PER updater decreases the next target PER variance (Δp(k+1)) by a preset step size if the target PER variance (Δp(k)) is larger than or equal to the previous target PER variance (Δp(k−1)) and the average capacity is smaller than the previous average capacity by a reference value or more.

16. The apparatus of claim 12, wherein the target PER updater does not vary the next target PER variance (Δp(k+1)) if the target PER variance (Δp(k)) is larger than or equal to the previous target PER variance (Δp(k−1)) and a difference between the average capacity and the previous average capacity is smaller than or equal to a reference value.

17. The apparatus of claim 12, wherein the target PER updater decreases the next target PER variance (Δp(k+1)) by a preset step size if the target PER variance (Ap(k)) is smaller than the previous target PER variance (Δp(k−1)) and the average capacity is larger than the previous average capacity by a reference value or more.

18. The apparatus of claim 12, wherein the target PER updater increases the next target PER variance (Δp(k+1)) by a preset step size if the target PER variance (Δp(k)) is smaller than the previous target PER variance (Δp(k−1)) and the average capacity is smaller than the previous average capacity by a reference value or more.

19. The apparatus of claim 12, wherein the target PER updater does not vary the next target PER variance (Δp(k+1)) if the target PER variance (Δp(k)) is smaller than the previous target PER variance (Δp(k−1)) and a difference between the average capacity and the previous average capacity is smaller than or equal to a reference value.

20. The apparatus of claim 12, further comprising a power controller for performing an outer loop power control to keep the target PER constant and then deciding outputs of mobile stations.

21. The apparatus of claim 20, further comprising: a load controller for performing a load control in consideration of the outputs of the mobile stations.

* * * * *